(12) United States Patent
Jeong (10) Patent No.: US 10,994,642 B2
(45) Date of Patent: May 4, 2021

(54) HEADREST MOVING DEVICE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 16/613,520

(22) PCT Filed: Jun. 18, 2018

(86) PCT No.: PCT/KR2018/006815
§ 371 (c)(1),
(2) Date: Nov. 14, 2019

(87) PCT Pub. No.: WO2018/236097
PCT Pub. Date: Dec. 27, 2018

(65) Prior Publication Data
US 2020/0070700 A1   Mar. 5, 2020

(30) Foreign Application Priority Data
Jun. 23, 2017   (KR) ........................ 10-2017-0079861

(51) Int. Cl.
*B60N 2/856*   (2018.01)
*B60N 2/844*   (2018.01)
*B60N 2/815*   (2018.01)

(52) U.S. Cl.
CPC ............. *B60N 2/856* (2018.02); *B60N 2/815* (2018.02); *B60N 2/844* (2018.02)

(58) Field of Classification Search
CPC .................................. B60N 2/856; B60N 2/844
See application file for complete search history.

(56) References Cited

U.S. PATENT DOCUMENTS

| 7,322,646 B2 * | 1/2008 | Jammalamadaka ... | B60N 2/844 297/216.12 |
| 7,325,877 B2 * | 2/2008 | Brockman ............. | B60N 2/844 297/408 |

(Continued)

FOREIGN PATENT DOCUMENTS

| JP | 2016-101842 | 6/2016 |
| KR | 100982796 B1 | 9/2010 |
| KR | 101404478 B1 | 6/2014 |

OTHER PUBLICATIONS

International Searching Authority/KR, International Search Report and the Written Opinion of the International Searching Authority, Application No. PCT/KR2018/006815, dated Oct. 12, 2018, 7 pages.

*Primary Examiner* — David R Dunn
*Assistant Examiner* — Tania Abraham
(74) *Attorney, Agent, or Firm* — Sunstein LLP (57) ABSTRACT

The present invention relates to a headrest moving device, and more particularly, to a headrest moving device in which one end of a strap is connected to a member to which a first member is connected, the other end of the strap is drawn out of a headrest or a seat, a guide rod configured to guide the strap is provided on the member to which the first member is connected, and a latching rod configured to latch a portion between one end and the other end of the strap is provided on the first member so that locking can be released through the strap drawn to the outside of the headrest. Thus, a user can easily recognize a way to release the locking and the first member can be smoothly rotated since the strap is smoothly guided.

2 Claims, 11 Drawing Sheets

(56) References Cited

U.S. PATENT DOCUMENTS

| | | | |
|---|---|---|---|
| 7,422,280 B2* | 9/2008 | Brockman | B60N 2/43 297/216.12 |
| 7,543,891 B2* | 6/2009 | Chung | B60N 2/859 297/408 |
| 8,449,036 B2 | 5/2013 | Jeong | |
| 8,511,751 B2 | 8/2013 | Bruck | |
| 8,746,799 B2* | 6/2014 | Dumont | B60N 2/305 297/403 |
| 9,573,499 B2* | 2/2017 | Lutzka | B60N 2/3009 |
| 2006/0061184 A1 | 3/2006 | Jennings | |
| 2017/0028884 A1* | 2/2017 | Kapusky | B60N 2/856 |

* cited by examiner

[Figure 1]

Prior Art

HEADREST MOVING DEVICE

TECHNICAL FIELD

The present invention relates to a moving device for moving a headrest such that the headrest is slid or folded relative to a seat.

BACKGROUND ART

A headrest device for providing occupants with a widest view by folding a headrest of a seat with no occupant is disclosed in Korean Patent Registration Publication No. 10-0982796.

Figure 1:
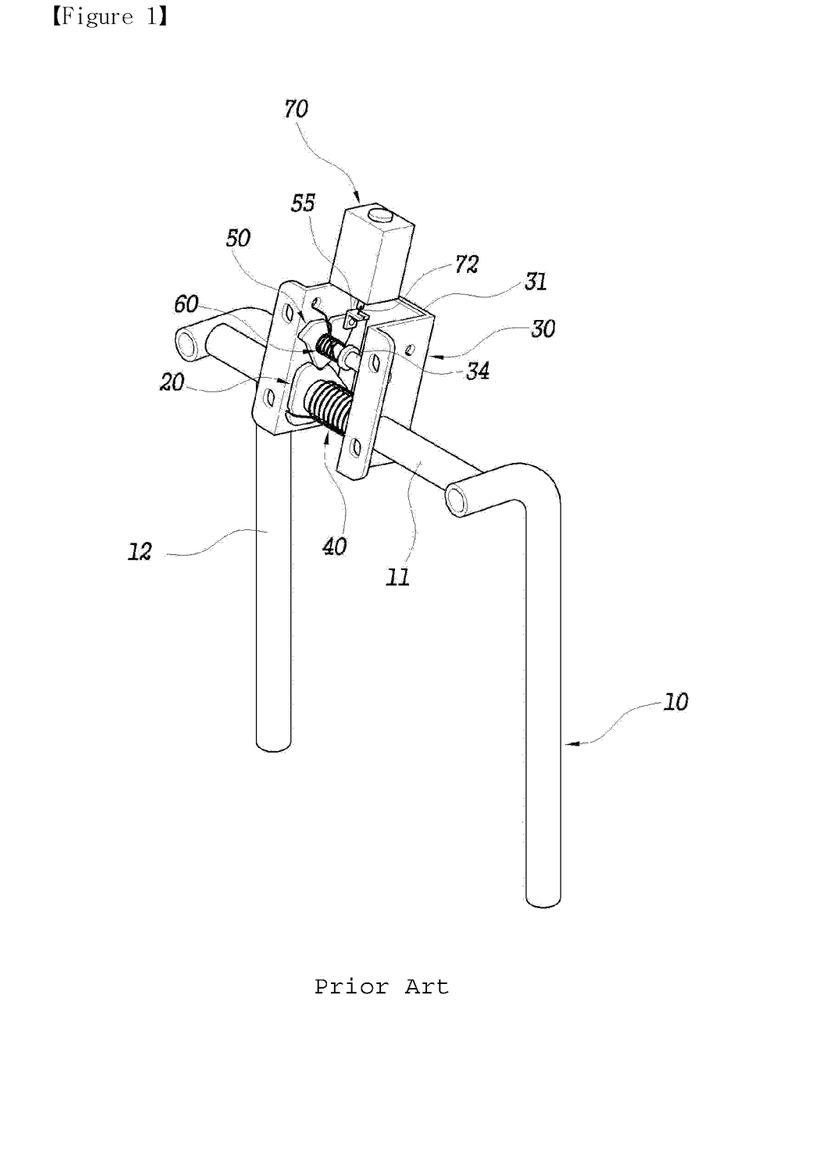
FIG. 1 is a perspective view showing an assembly of main parts of a headrest according to the related art.
Figure 2:
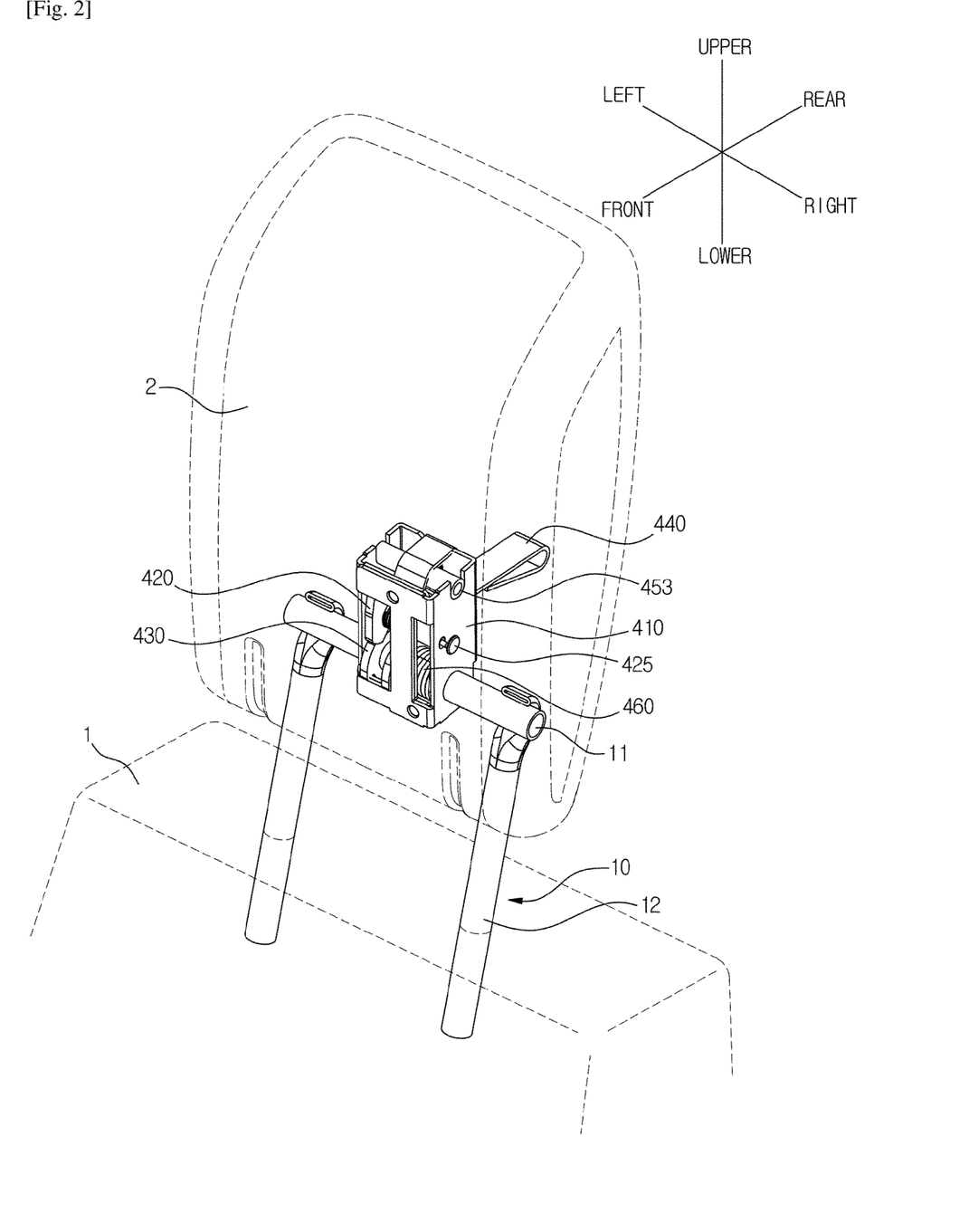
FIG. 2 is a perspective view showing a headrest moving device according to a first embodiment of the present invention which is installed in a seat and a headrest.

A headrest according to the related art includes a stay rod 10 having a first rod 11 and a pair of second rods 12 extending downward from both ends of the first rod 11, a ratchet member 20 fixedly coupled to a horizontal portion, a rotating member 30 for coupling shaft holes formed in lower portions of both side plates with the horizontal portion such that the ratchet member 20 comes into contact with an inner surface of one side plate of the both side plates, a return spring 40 coupled to the horizontal portion to be interposed between an inner surface of the ratchet member and an inner surface of the other side plate of the rotating member, in which an inner end of the return spring 40 is latched on the ratchet member and an outer end of the return spring 40 is latched on the rotating member so that an elastic force is applied to the rotating member to rotatably fold the rotating member rearward, a braking member 50 coupled to a fixing shaft 34, both ends of which are fixed to upper portions of the both side plates to be located directly above the ratchet member, wherein the braking member brakes so that the rotating member is maintained in the upright state when the braking member is engaged with the ratchet member, and operates so that the rotating member is folded down due to elasticity of the return spring when the braking member is disengaged from the ratchet member, a braking spring 60 coupled to the fixing shaft and having one end latched on the braking member and the other end latched on the rotating member to maintain the engagement between the braking member and the ratchet member, and a release member 70 for releasing the latched state of the braking member.

Reference numerals 72 and 55 denote a wire and a connecting piece, respectively.

In the headrest according to the related art, the release member 70 is provided as a solenoid installed in the headrest or seat or as a button installed at a lateral side of the headrest. When the release member 70 is provided as a solenoid, a weight of the device is increased so that the manufacturing cost of the device may be increased and an electrical connection is required. When the release member 70 is provided as a button, the rotating direction of the braking member 50 is perpendicular to a pushing direction for the button, so that an actuating force may not be smoothly transferred. For this reason, the number of components and the weight of the device may be increased.

PRIOR ART DOCUMENT

Patent Document (Patent Document 1) Korean Patent Registration Publication No. 10-0982796

DISCLOSURE

Technical Problem

The present invention has been made to solve the above problems and an object of the present invention is to provide a headrest moving device having a simple structure and capable of minimizing a weight thereof while smoothly transferring an actuating force.

Technical Solution

In order to achieve the above object, a headrest moving device according to the present invention includes a stay rod, a bracket which is rotatable or slidable relative to the stay rod, a first member rotatably connected to one of the stay rod and the bracket and a second member connected to the remaining one of the stay rod and the bracket, and a strap configured to rotate the first member, wherein the first member is locked to or unlocked from the second member, one end of the strap is connected to a member to which the first member is connected, the other end of the strap is drawn to the outside of a headrest or a seat, a guide rod configured to guide the strap is provided on the member to which the first member is connected, and a latching rod configured to latch a portion between the one end and the other end of the strap is provided on the first member.

The bracket may be disposed between both sides of the stay rod, the first member may be rotatably connected to the bracket, the second member may be connected to the stay rod, the first and second members may be disposed inside the bracket, the guide rod may be spaced apart from the latching rod in the up/down direction, and the guide rod may be disposed between a front end and a rear end of the bracket.

Advantageous Effects

The headrest moving device described above according to the present invention has the following effects.

One end of the strap is connected to the member to which the first member is connected, the other end of the strap is drawn out of the headrest or the seat, the guide rod for guiding the strap is provided on the member to which the first member is connected, and the latching rod for latching a portion between one end and the other end of the strap is provided on the first member so that locking can be released by the strap drawn to the outside of the headrest. Thus, a user may easily recognize a way to release the locking and the first member may be smoothly rotated since the strap is smoothly guided. Further, the present invention can maintain the simple structure, reduce the weight of the device, and smoothly transfer the actuating force.

According to the present invention, main parts are disposed inside the bracket and concentrated at the central part of the first rod, so that the device can have a compact size and can be modularized, and thus the assembling work for the product can be simplified, the product can be easily replaced, and the repair and maintenance work can be facilitated.

MODE FOR INVENTION

Hereinafter, exemplary embodiments of the present invention will be described in detail with reference to the accompanying drawings.

For reference, components of the present invention which are the same as those of the related art as described above will not be described in detail separately, but instead, the related art described above will be referenced.

When it is mentioned that one part is "above" another part, this means that the part may be directly above the other part or may be accompanied by another different part therebetween. In contrast, if it is mentioned that one part is "directly above" the other part, no other part is interposed therebetween.

The terminology used herein is merely for describing particular embodiments and is not intended to limit the present invention. As used herein, the singular form also includes the plural form unless indicated otherwise. The meaning of "including" as used in the specification embodies specific characteristics, regions, integers, steps, operations, elements and/or components, however, it does not exclude the presence or addition of other specific characteristics, regions, integers, steps, operations, elements, components and/or groups.

The terms "bottom", "top" and the like that represent a relative space may be used to easily describe the relationship of one part with respect to the other part illustrated in the drawing. These terms are intended to include other meanings or operations of the device that are used in addition to the meaning intended in the drawing. For example, if the device in the drawing is turned over, the part which was in the "lower" side of the other part is now in the "upper" side of the other part. Thus, the exemplary term "lower" includes both upper and lower directions. A device may be rotated by 90°, or may be rotated by a different angle, and also the terms indicating the relative space may be interpreted accordingly.

When it is described that an element is "coupled" or "connected" to another element, the element may be directly coupled or connected to the other element or another element may also be present therebetween.

FIRST EMBODIMENT OF THE PRESENT INVENTION

As shown in FIGS. 2 to 7, a headrest moving device according to a first embodiment includes a stay rod 10, a bracket 410 which is rotatable or slidable relative to the stay rod 10, a first member 420 rotatably connected to one of the stay rod 10 and the bracket 410, a second member 430 connected to the remaining one of the stay rod 10 and the bracket 410, and a strap 440 for rotating the first member 420. The first member 420 is locked to or unlocked from the second member 430, one end 441 of the strap 440 is connected to a member to which the first member 420 is connected, the other end 442 of the strap 440 is drawn to the outside of a headrest 2 or a seat 1, a guide rod 453 for guiding the strap 440 is provided on the member to which the first member 420 is connected, and a latching rod 454 for latching a portion between the one end 441 and the other end 442 of the strap 440 is provided on the first member 420.

In the following description, a width direction of a vehicle will be referred to as a left and right direction, a length direction of the vehicle will be referred to as a front and rear direction, and a vertical direction of the vehicle will be referred to as an up/down direction.

The stay rod 10 includes a first rod 11 horizontally disposed in the left and right direction and a second rod 12 disposed at both sides of the first rod 11 in the up/down direction. In this embodiment, the first rod 11 and the second rod 12 are separately provided and both sides of the first rod 11 are coupled to the second rods 12 after assembling the bracket 410 and the like. For example, the first rod 11 may be coupled to the second rod 12 through welding or the like. Alternatively, the first rod 11 and the second rod 12 may be integrally formed.

One of the stay rod 10 and the bracket 410 is connected to the seat 1 and the other is connected to the headrest 2. In this embodiment, the seat 1 is connected to a lower portion of the stay rod 10, and the bracket 410 is disposed inside the headrest 2.

The bracket 410 may be rotatable (foldable) or slidable forward or backward with respect to the stay rod 10. In this embodiment, the bracket 410 is foldable forward with respect to the stay rod 10.

The bracket 410 is concentratedly installed at the center of the first rod 11 so as to be disposed between the second rods 12 provided at both sides of the bracket 410. The bracket 410 may be formed of a metal material or a synthetic resin material.

The bracket 410 is formed in a rectangular parallelepiped shape having an open top and an open bottom and extending in the vertical direction.

The bracket 410 is installed at the center of the first rod 11 so as to rotate with respect to the first rod 11.

The bracket 410 includes a first bracket part 411 and a second bracket part 412 provided on the first bracket part 411. In this manner, the bracket 410 may be divided into two members. Alternatively, the bracket 410 may be integrally formed as one member.

Figure 3:
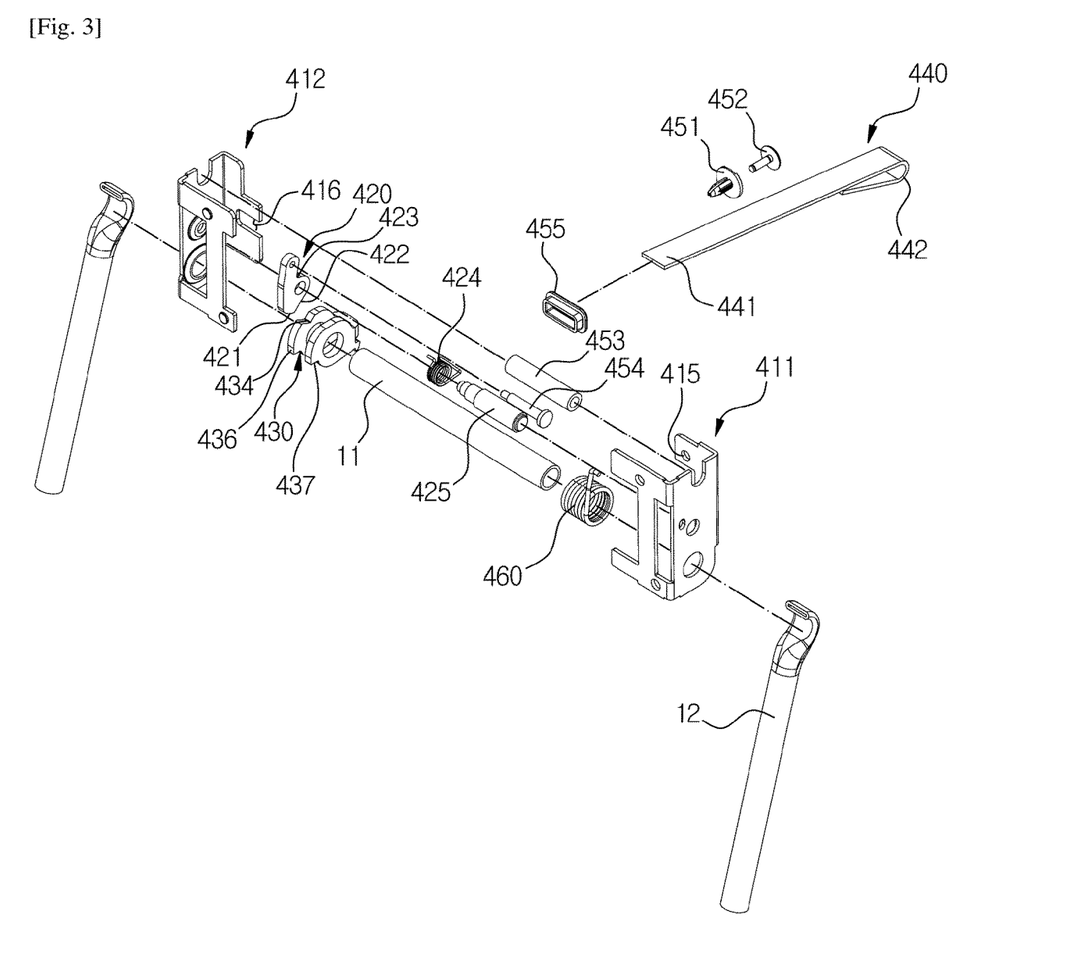
FIG. 3 is an exploded perspective view of the headrest moving device according to the first embodiment of the present invention.
Figure 4:
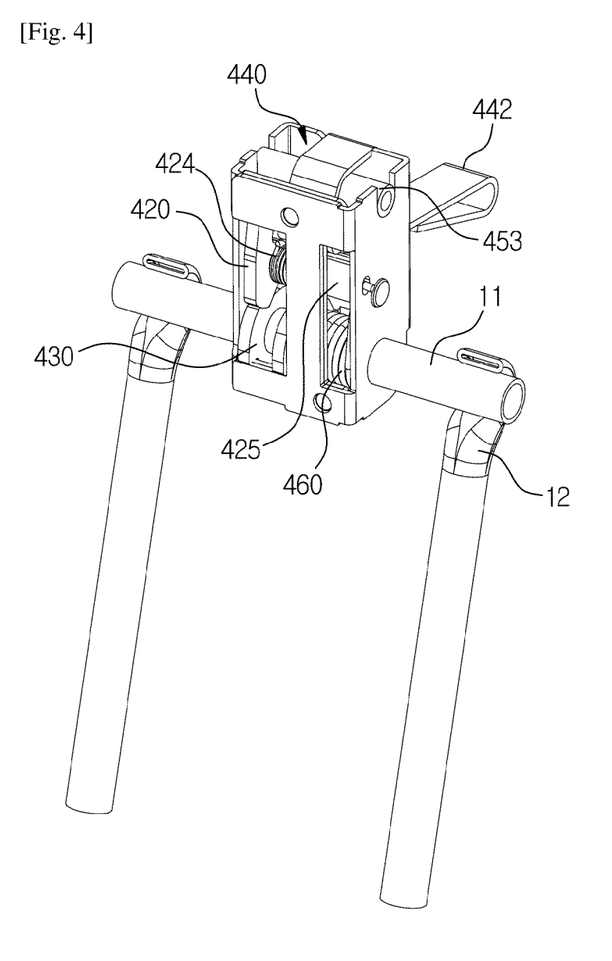
FIG. 4 is a front perspective view of the headrest moving device according to the first embodiment of the present invention.

As shown in FIG. 3, the first bracket part 411 and the second bracket part 412 each have a front surface, a side surface formed by bending a left side or a right side of the front surface, and a rear surface formed by bending a rear side of the side surface. The front surface, the side surface, and the rear surface of the first bracket part 411 are integrally formed. The front surface, the side surface, and the rear surface of the second bracket part 412 are integrally formed.

The bracket 410 has a rectangular parallelepiped shape in which a length of the side surface in the vertical direction is longer than a length of the side surface in the front and rear direction.

The front surface of the first bracket part 411 overlaps the front surface of the second bracket part 412. The front surface of the first bracket part 411 has a coupling hole formed to pass through in the front and rear direction and the front surface of the second bracket part 412 has a coupling protrusion protruding forward so as to be inserted into the coupling hole, so that the first bracket part 411 is coupled to the second bracket part 412. Alternatively, the first bracket part 411 may be coupled to the second bracket part 412 by welding a part of the overlapping portion of the first bracket part 411 and the second bracket part 412. Interference-preventing holes are formed through the front surfaces of the first bracket part 411 and the second bracket part 412 in the front and rear direction, respectively. The interference-preventing holes are elongated in the vertical direction.

The length of the rear surfaces of the first bracket part 411 and the second bracket part 412 is shorter than the length of the front surfaces of the first bracket part 411 and the second bracket part 412 in the left and right direction such that the rear surfaces of the first bracket part 411 and the second bracket part 412 may not overlap each other. An upper portion of the rear surface of the first bracket part 411 protrudes to the left and a lower portion of the rear surface of the second bracket part 412 protrudes to the right. Accordingly, the rear surface of the first bracket part 411 and the rear surface of the second bracket part 412 are engaged with each other.

A fastening hole 415 is formed through a protruding portion of the rear surface of the first bracket part 411 in the front and rear direction.

In addition, a strap guide hole, into which the strap 440 is inserted, is formed through the protruding portion of the rear surface of the first bracket part 411 in the front and rear direction. An upper portion of the strap guide hole is open. Thus, the one end 441 of the strap 440 does not shake in the left and right direction.

A bezel mounting hole 416 is formed through the rear surface of the first bracket part 411 and the rear surface of the second bracket part 412 in the front and rear direction. A right side (a part) of the bezel mounting hole 416 is formed in the rear surface of the first bracket part 411 and a left side (the remaining part) of the bezel mounting hole 416 is formed in the rear surface of the second bracket part 412. That is, the bezel mounting hole 416 formed in the rear surface of the first bracket part 411 and the rear surface of the second bracket part 412 communicate with each other. The bezel mounting hole 416 is disposed below the fastening hole 415. The bezel mounting hole 416 and the fastening hole 415 are disposed at the center of the headrest 2 and the bracket 410.

First rod through holes are formed in lower sides of the first bracket part 411 and the second bracket part 412 in the left and right direction and the first rod 11 passes through the first rod through holes.

In addition, insertion holes, into which a first member shaft 425 is inserted, are formed in middle portions of the side surfaces of the first bracket part 411 and the second bracket part 412 to pass through in the left and right direction.

Guide rod mounting grooves, on which the guide rod 453 is mounted, are formed in upper portions of the side surfaces of the first bracket part 411 and the second bracket part 412 to pass through in the left and right direction. An upper portion of the guide rod mounting grooves is open. The guide rod mounting grooves are spaced apart from the insertion holes in the front and rear direction. In this embodiment, the guide rod mounting grooves are disposed rearward of the insertion holes.

Spring-fitting holes are formed in the side surfaces of the first bracket part 411 and the second bracket part 412, respectively.

The first member 420 is rotatably connected to one of the stay rod 10 and the bracket 410, and the second member 430 is connected to the other. In this embodiment, the first member 420 is rotatably connected to the bracket 410, and the second member 430 is fixedly installed on the stay rod 10. Alternatively, the first member 420 may be rotatably connected to the stay rod 10, and the second member 430 may be connected to the bracket 410.

The first member 420 is rotatably installed inside the bracket 410 by the first member shaft 425 having both sides connected to the side surfaces of the first bracket part 411 and the second bracket part 412. Accordingly, the first member 420 is rotatable with respect to the bracket 410.

The first member 420 has a plate shape and is disposed in the front and rear direction. The thickness of the first member 420 is smaller than the thickness of the strap 440 when measured in the left and right direction.

The first member 420 is arranged closer to the second bracket part 412 than to the first bracket part 411.

The first member 420 has a first through hole formed in the left and right direction and the first member shaft 425 is inserted into the first through hole. The first member 420 has a rod mounting hole formed in the left and right direction and the latching rod 454 is installed in the rod mounting hole.

A fixing member (not shown) is provided on the other side (left side) of the first member shaft 425. A mounting groove on which the fixing member is mounted is formed in the outside of the second bracket part 412. The mounting groove is recessed from the outside to the inside so that a protrusion is formed on a surface of the second bracket part 412 facing the first member 420. Such a protrusion can minimize friction between the second bracket part 412 and the first member 420.

On the other side of the first member shaft 425, there are provided a first stepped portion, a second stepped portion having an outer diameter larger than an outer diameter of the first stepped portion, and a third stepped portion having an outer diameter larger than an outer diameter of the second stepped portion. The first member 420 is fitted to the second stepped portion, and the second bracket part 412 is fitted to the first stepped portion. Therefore, the first member 420 is prevented from shaking in the left and right direction.

Similar to the first member shaft 425, a stepped portion is provided in a shaft included in the headrest moving device of this embodiment. Further, when a surface faces a rotating member, a protrusion may be formed on the rotating member or the surface for reducing friction.

A first ratchet 421 protrudes outward from an outer peripheral surface of the first member 420. A width of the first ratchet 421 in the front and rear direction becomes narrower as the first ratchet 421 extends outward.

A first curved portion 422 is formed on an outer peripheral surface of the first member 420 to be continuous with the first ratchet 421. When the first ratchet 421 is in the locked state, the first ratchet 421 is vertically spaced apart from the first member shaft 425. In this embodiment, the first ratchet 421 is disposed below the first member shaft 425.

The latching rod 454 is installed in the first member 420 in the left and right direction.

The latching rod 454 is spaced apart from the first member shaft 425 in the front and rear direction when the latching rod 454 is in the locked state. In this embodiment, the latching rod 454 is disposed forward of the first member shaft 425 when the latching rod 454 is in the locked state.

The latching rod 454 is vertically spaced apart from the first member shaft 425 when the latching rod 454 is in the locked state. In this embodiment, the latching rod 454 is disposed above the first member shaft 425 when the latching rod 454 is in the locked state.

A latching protrusion is provided at a free end of the latching rod 454 to prevent the strap 440 from being separated.

In addition, a spring-latching portion 423 having a groove shape is provided in an outer peripheral surface of the first member 420 and one end of a first member spring 424 is latched on the spring-latching portion 423. The first member spring 424 returns the first member 420 to its original position. In this embodiment, the first member spring 424 returns the first member 420 to the locking position. The first member spring 424 is provided as a coil spring. The first member spring 424 is fitted to the third stepped portion of the first member shaft 425. Accordingly, the first member spring 424 is disposed on the right side of the first member 420. The other end of the first member spring 424 is latched in the spring-fitting hole formed in the second bracket part 412.

The first curved portion 422, the first ratchet 421, the latching rod 454, and the spring-latching portion 423 are sequentially disposed clockwise when viewed from the right side.

The second member 430 is rotatable relative to the bracket 410 and is locked to or unlocked from the first member 420. The first member 420 and the second member 430 are locked or unlocked based on the principle of a pawl and ratchet.

The second member 430 also has a plate shape arranged in the front and rear direction and is disposed inside the bracket 410.

The second member 430 is disposed below the first member 420.

The second member 430 includes a first plate, and a second plate (left side) and a third plate (right side), which are bent forward at both sides of the first plate. Thus, strength can be improved due to the second member 430 having the above configuration.

A through hole is formed through the second plate and the third plate of the second member 430 in the left and right direction and the first rod 11 passes through the through hole. The second member 430 is fixed to the first rod 11 through welding or the like, so that the second member 430 is rotatable relative to the bracket 410.

A protrusion that protrudes in the left and right direction is formed on a surface of the second bracket part 412 facing the second plate of the second member 430. The protrusion can minimize friction between the second bracket part 412 and the second member 430.

A second ratchet 434, which is engaged with the first ratchet 421, is provided in the second plate of the second member 430.

The second ratchet 434 has a groove shape into which the first ratchet 421 is inserted.

When the first ratchet 421 is engaged with the second ratchet 434, the locked state is maintained so that the unfolded state (upright state) is realized. When the first ratchet 421 is disengaged from the second ratchet 434, the unlocked state is maintained so that the folded state is realized.

A second curved portion 436 having a convex shape is formed on an outer peripheral surface of the second member 430 to be continuous with the second ratchet 434. The second curved portion 436 has an arc shape. The second curved portion 436 comes into contact with the first curved portion 422 when folded.

Stopper projections 437 are formed on outer peripheral surfaces of the second plate and the third plate of the second member 430 so as to protrude outward continuously with the second curved portion 436. The stopper projections 437 protrude forward. When the first ratchet 421 is engaged with the second ratchet 434 (in the unfolded state), the stopper projection 437 is inserted into the interference-preventing hole and latched on the bracket 410. Therefore, if the unfolding position is achieved when the user moves the headrest 2 from the folded state to the unfolded state, the headrest 2 is no longer rotated backward to prevent the device from being damaged. Further, when the headrest 2 is in the unfolded state, the force for supporting a head of an occupant can be distributed to the first and second ratchets 421 and 434 and the stopper projection 437, so that the head can be stably supported and durability can be improved.

Further, the first plate is configured to be latched on the bracket 410 when the headrest 2 is in the upright state.

The second ratchet 434, the second curved portion 436, and the stopper projection 437 are sequentially arranged counterclockwise when viewed from the right side.

In addition, a return spring 460 is further provided to return the headrest 2 to its original position.

The return spring 460 is disposed inside the bracket 410 so as to be arranged on the right side of the second member 430.

The return spring 460 is provided as a coil spring.

The center portion (coil portion) of the return spring 460 is fitted to the first rod 11. One end of the return spring 460 is latched on a return spring-latching portion formed on the first plate of the second member 430 and the other end of the return spring 460 is latched in a spring-fitting hole of the first bracket part 411.

The return spring 460 rotates the first member 420 and the bracket 410 to the folding position with respect to the second member 430 when the first member 420 and the second member 430 are unlocked.

The strap 440 unlocks the first member 420 and the second member 430 by rotating the first member 420.

The strap 440 is formed of a flexible fabric material. The width of the strap 440 in the left and right direction is greater than the thickness of the strap 440 in the vertical direction.

The one end 441 of the strap 440 is connected to the bracket 410 which is a member to which the first member 420 is connected and the other end 442 of the strap 440 is drawn out of the headrest 2 or the seat 1. In this embodiment, the other end 442 of the strap 440 is drawn rearward of the headrest 2.

A hook is formed at the other end 442 of the strap 440 so that a user can easily pull the strap 440.

The one end 441 of the strap 440 is fixed to the rear surface of the bracket 410 by a first bolt 451 and a second bolt 452.

The first bolt 451 and the second bolt 452 are inserted into the fastening hole 415. The first bolt 451 and the second bolt 452 may be formed of a synthetic resin or the like.

The first bolt 451 includes a first head portion and a first insertion portion.

The second bolt 452 includes a disk-shaped second head portion and a cylindrical second insertion portion. A groove is formed along entire front and rear peripheral surfaces of the second insertion portion.

An insertion hole, into which the second insertion portion is inserted, is formed in the center of the first head portion and the first insertion portion in the front and rear direction. The insertion hole has a tapered shape so that a sectional area of the insertion hole becomes smaller in the forward direction.

Figure 5:
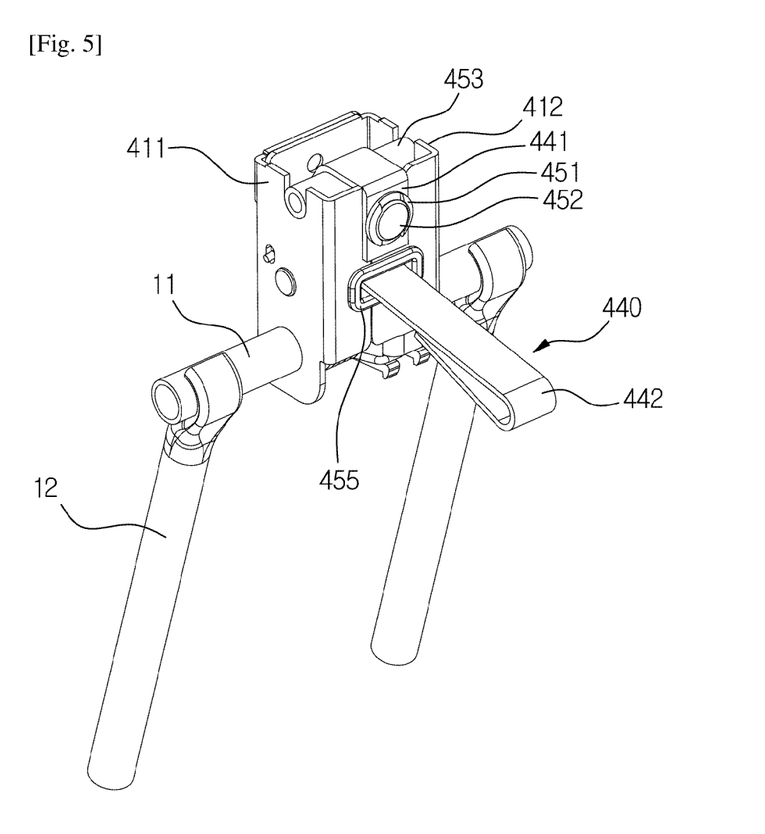
FIG. 5 is a rear perspective view of the headrest moving device according to the first embodiment of the present invention.

As shown in FIG. 5, a head mounting groove is formed in the first head portion and the second head portion is mounted on the head mounting groove. The head mounting groove communicates with the insertion hole. In addition, cutout grooves are formed at an upper portion and a lower portion of the first head portion, respectively, so as to communicate with the head mounting groove. The second bolt 452 can be easily removed from the first bolt 451 due to the cutout grooves.

A sharp tapered portion is formed at a tip of the first insertion portion.

A plurality of serrated projections are formed on both sides of an outer surface of the first insertion portion. The plurality of serrated projections are continuously arranged in the front and rear direction. Due to the projections, the first bolt 451 can be moved in the insertion direction (front direction) and cannot be moved in the reverse direction, which is the release direction. That is, when inserting the first bolt 451 into the fastening hole 415 of the bracket 410, the first bolt 451 can be smoothly inserted into the fastening hole 415 along an inclined surface of the projection. However, when pulling out the first bolt 451 in the opposite direction, the first bolt 451 is blocked by a vertical surface of the projection so that the first bolt 451 may not be separated.

Due to the first bolt 451 having the above configuration, the strap 440 can be securely installed.

Incision holes are formed at upper and lower portions of the first insertion portion so as to communicate with the insertion hole.

A method of fixing the strap 440 using the first and second bolts 451 and 452 is as follows. After the one end 441 of the strap 440 is brought into contact with the rear surface (outer side) of the bracket 410, the first bolt 451 is pushed forward such that the first bolt 451 is inserted into the fastening hole 415 after passing through the strap 440. The second insertion portion of the second bolt 452 is inserted into the insertion hole of the first bolt 451.

Figure 6:
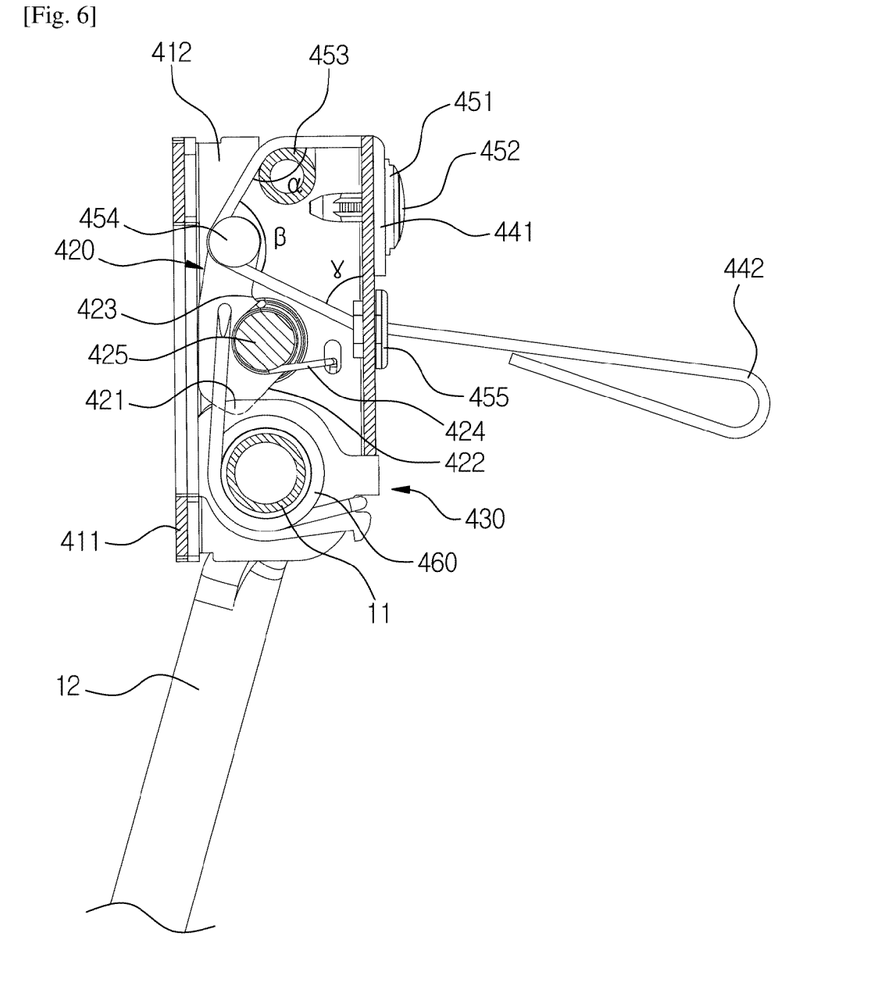
FIG. 6 is a sectional view of the headrest moving device according to the first embodiment of the present invention (upright state of headrest).

As shown in FIG. 6, after the strap 440 with the fixed one end 441 is guided to an upper portion of the guide rod 453, the strap 440 is latched on the latching rod 454 and then drawn out to the outside.

The guide rod 453 is installed on the bracket 410 which is the member to which the first member 420 is connected.

The guide rod 453 is horizontally disposed in the left and right direction and is mounted on the guide rod mounting grooves of the bracket 410. The guide rod 453 is disposed in the middle of the bracket 410 between a front end and a rear end of the bracket 410.

The height of an uppermost end of the guide rod 453 is the same as or similar to the height of the rear surface of the bracket 410 on which the one end 441 of the strap 440 is latched.

The guide rod 453 has a cylindrical shape such that a portion in contact with the strap 440 is formed in an arc shape. The radius of the guide rod 453 is larger than the thickness of the rear surface of the bracket 410. The radius of the guide rod 453 is larger than the radius of the latching rod 454.

The guide rod 453 is spaced apart from the latching rod 454 in the front and rear direction when the headrest 2 is in the upright state. In this embodiment, the guide rod 453 is disposed rearward of the latching rod 454 when the headrest 2 is in the upright state. The guide rod 453 is vertically spaced apart from the latching rod 454 when the headrest 2 is in the upright state. In this embodiment, the guide rod 453 is disposed above the latching rod 454 when the headrest 2 is in the upright state.

The guide rod 453 is spaced apart from the first member shaft 425 in the up/down direction and the front and rear direction, when in the upright state. In this embodiment, the guide rod 453 is disposed above the first member shaft 425 and rearward of the first member shaft 425.

The latching rod 454 latches a portion between the one end 441 and the other end 442 of the strap 440.

The strap 440 is drawn out by passing through a bezel 455. That is, the strap 440 is drawn out by passing through a hole which is formed through the bracket 410 in the front and rear direction.

The bezel 455 is formed of a material such as a synthetic resin, and surrounds the bezel mounting hole 416. The bezel 455 includes a bezel insertion portion inserted into the bezel mounting hole 416 and a bezel latching portion formed at a rear end of the bezel insertion portion and latched on the rear surface of the bracket 410. The bezel insertion portion and the bezel latching portion have a strap through hole and the strap 440 passes through the strap through hole. The strap through hole is elongated in the left and right direction so as to correspond to the shape of the strap 440. The strap through hole may prevent the strap 440 from being twisted. A length of the bezel insertion portion in the front and rear direction is larger than a thickness of the rear surface of the bracket 410 in the front and rear direction.

This bezel 455 may minimize friction when strap 440 is pulled, thereby minimizing wear of the strap 440.

The bezel 455 is installed on the rear surface of the bracket 410 and disposed below the first and second bolts 451 and 452, the guide rod 453, and the latching rod 454. The bezel 455 is disposed rearward of the guide rod 453 and the latching rod 454.

The bezel 455 is disposed above the first member shaft 425. The strap 440 passing through the bezel 455 is disposed above the first member shaft 425.

The bezel 455 is arranged closer to the first member shaft 425 than to the latching rod 454 in the up/down direction.

The strap 440 is guided by the bracket 410, the guide rod 453 and the latching rod 454 in the following manner. As shown in FIG. 6, the strap 440 in contact with an outer portion of the rear surface of the bracket 410 is vertically disposed. Then, the strap 440 is guided to an upper portion of the rear surface of the bracket 410 so as to be horizontally disposed while being guided by the guide rod 453 after passing through the strap guide hole. Then, the strap 440 is guided by the latching rod 454 disposed at a front lower portion of the guide rod 453 so that the strap 440 is bent downward at an obtuse angle (α). The angle (α) of the strap 440 bent by the guide rod 453 and the latching rod 454 is 119.6°. The angle (α) has a value in the range of 100° to 120°. Then, after passing between the guide rod 453 and the first member shaft 425, the strap 440 is guided by the bezel 455 disposed below at the back of the guide rod 453, so that the strap 440 is bent downward at an acute angle (β). The angle (β) of the strap 440 bent by the guide rod 453 and the bezel 455 is 87.3°. The angle (β) has a value in the range of 80° to 90°. An angle between the strap 440 drawn to the bezel 455 and an inner surface of the rear surface of the bracket 410 is an acute angle (γ). The angle (γ) is 63.1° and has a value in the range of 60° and 70°. The angle (β) of the strap 440 bent by the latching rod 454 is greater than the angle (γ) defined between the strap 440 drawn to the bezel 455 and the inner surface of the rear surface of the bracket 410.

Hereinafter, the operation of the present embodiment having the above configuration will be described.

Unfolded State (Locked State)

As shown in FIG. 6, the first ratchet 421 is engaged with the second ratchet 434 so that the headrest 2 is maintained in the upright state on the seat 1.

Folded State (Unlocked State)

When the user pulls the other end 442 of the strap 440, the strap 440 between the guide rod 453 and the bezel 455 is tightened. Therefore, the latching rod 454 slides relative to the strap 440 while being guided by the strap 440. The latching rod 454 moves rearward and upward relative to the bracket 410 as an angle defined between the guide rod 453, the latching rod 454 and the bezel 455 becomes larger. As a result, when viewed from the right side, the first member 420 rotates clockwise. Thus, the first ratchet 421 is disengaged from the second ratchet 434 so that the locking is released. The first member 420 and the headrest 2 are rotated about the first rod 11 by the elastic force of the return spring 460 so that the headrest 2 is folded forward.

Figure 7:
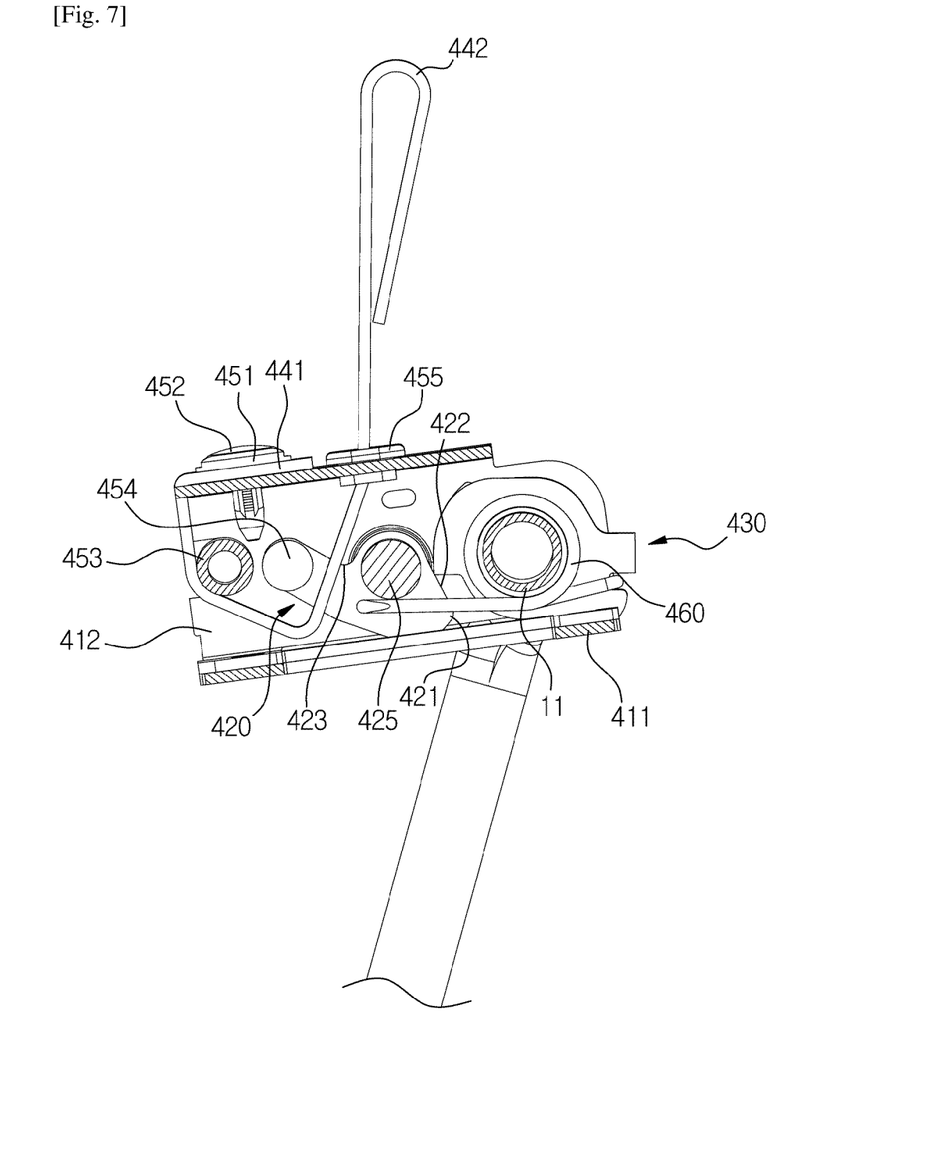
FIG. 7 is a sectional view of the headrest moving device according to the first embodiment of the present invention (folded state of headrest).
Figure 8:
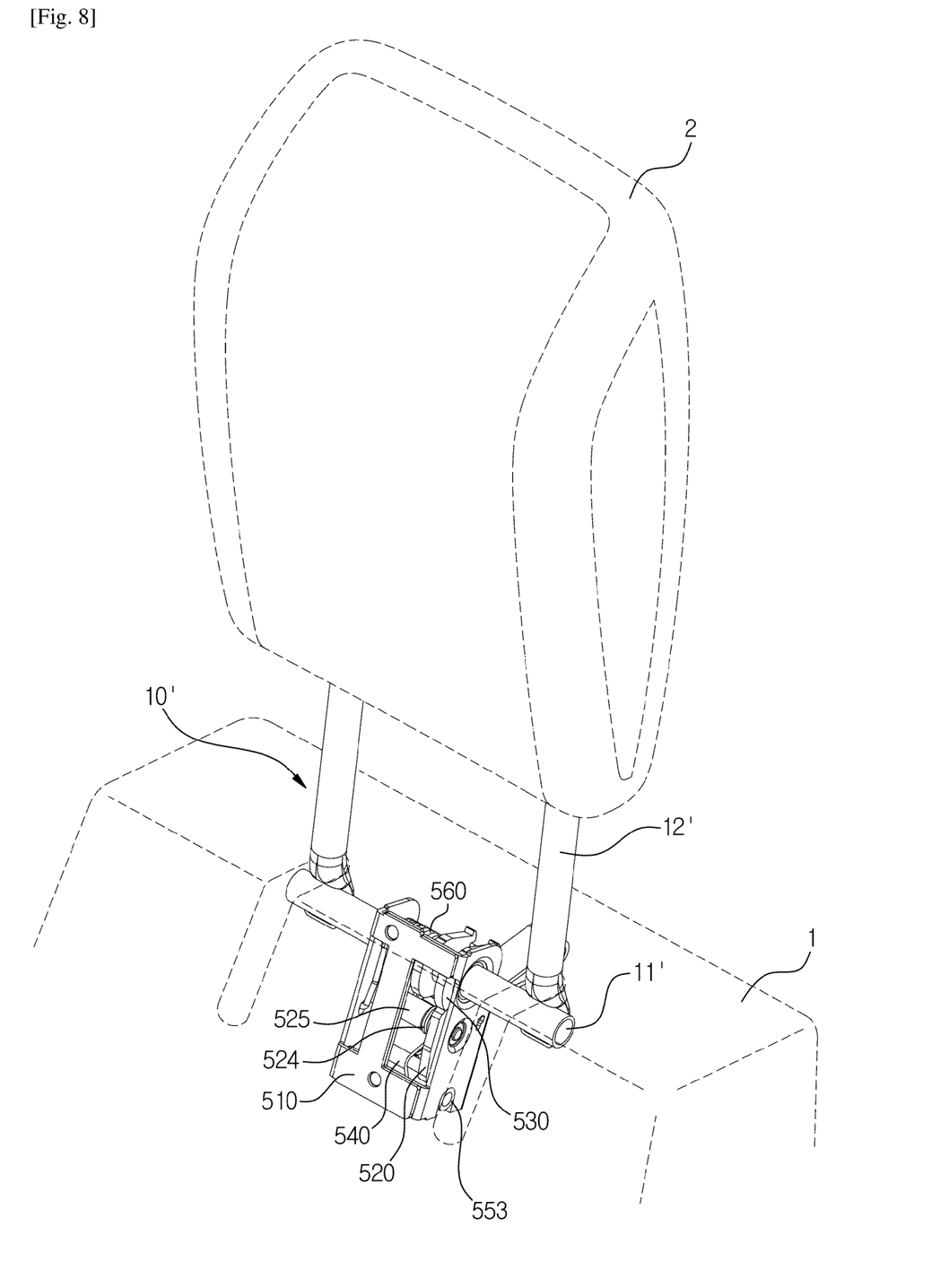
FIG. 8 is a perspective view showing a headrest moving device according to a second embodiment of the present invention which is installed in a seat and a headrest.

As shown in FIG. 7, the second bracket part 412 is latched on the one surface of the second member 430 so that the folding is completed. As the folding is completed, the second curved portion 436 and the first curved portion 422 are brought into contact with each other.

The process of unfolding the folded headrest 2 is as follows.

When the headrest 2 is lifted up and pushed rearward, the first member 420 and the headrest 2 are rotated clockwise. Further, the first member 420 is rotated counterclockwise by the elastic force of the first member spring 424. As a result, the first ratchet 421 is engaged with the second ratchet 434, so that the headrest 2 is maintained in the unfolded state. In addition, as the first ratchet 421 is engaged with the second ratchet 434, the stopper projection 437 of the second member 430 is caught on the bracket 410 so that the movement of the headrest 2 is stopped even if the user further pushes the headrest 2.

SECOND EMBODIMENT OF THE PRESENT INVENTION

In describing a headrest moving device according to a second embodiment of the present invention, the same reference numerals will be used for the same or similar components as those of the headrest moving device according to the previous embodiment of the present invention, and the detailed description and illustration thereof will be omitted.

As shown in FIGS. 8 to 12, a bracket 510 of the headrest moving device according to the second embodiment of the present invention is connected to a seat 1, and an upper portion of a stay rod 10' is connected to a headrest 2.

A first rod 11' is connected to a lower portion of a second rod 12'.

The bracket 510 is disposed inside the seat 1 and fixed to a seat frame or the like.

In this embodiment, the bracket 510 is foldable forward with respect to the stay rod 10'.

The stay rod 10' is rotatable with respect to the bracket 510.

Figure 9:
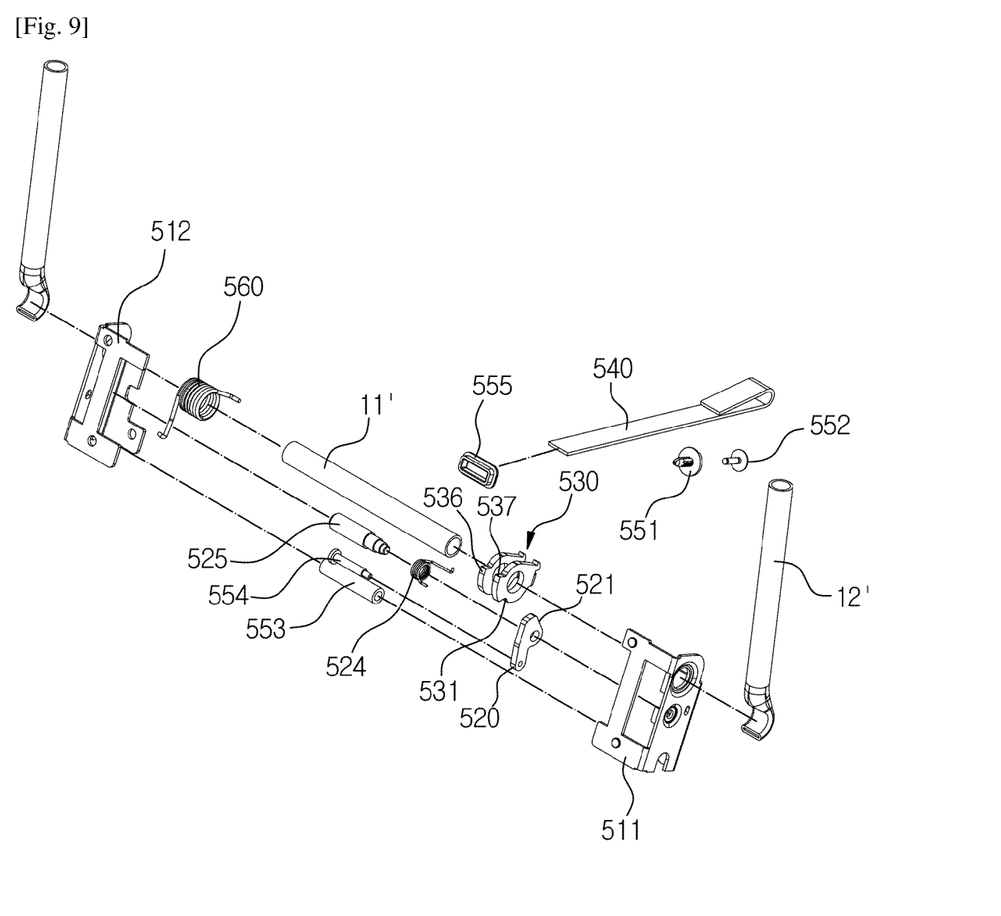
FIG. 9 is an exploded perspective view of the headrest moving device according to the second embodiment of the present invention.
Figure 10:
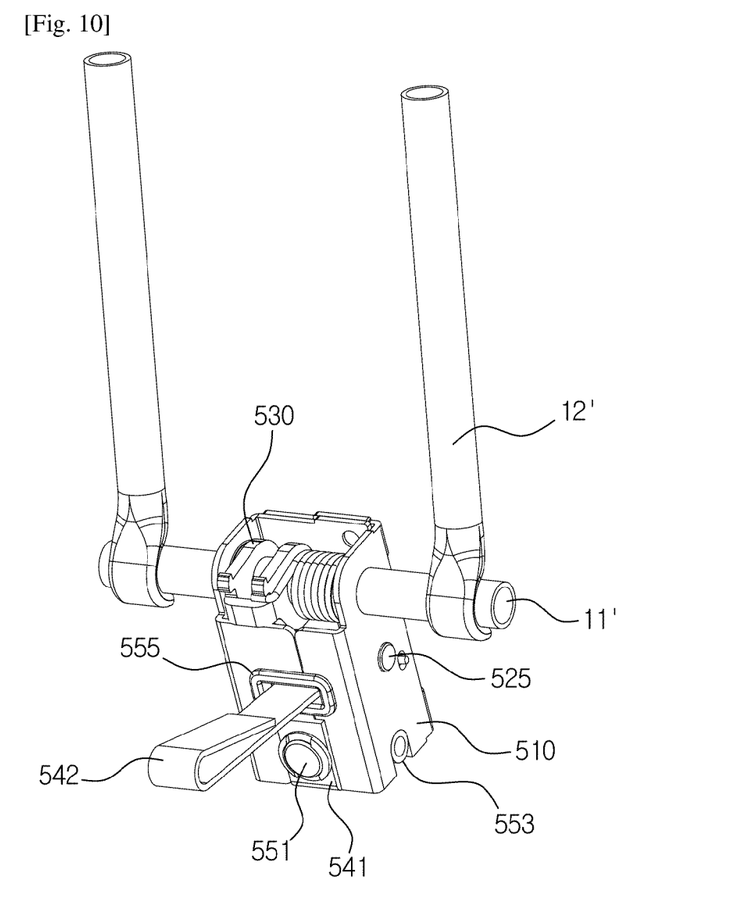
FIG. 10 is a rear perspective view of the headrest moving device according to the second embodiment of the present invention.

The bracket 510 includes a first bracket part 511 and a second bracket part 512 installed on the first bracket part 511.

A bezel mounting hole 516 is disposed above a fastening hole into which first and second bolts 551 and 552 are inserted. The bezel mounting hole 516 and the fastening hole 515 are disposed at the center of the seat 1 and the bracket 510.

First rod through holes are formed in upper portions of side surfaces of the first bracket part 511 and the second bracket part 512 in the left and right direction and the first rod 11' passes through the first rod through holes.

In addition, insertion holes, into which a first member shaft 525 is inserted, are formed in middle portions of the side surfaces of the first bracket part 511 and the second bracket part 512 to pass through in the left and right direction.

Guide rod mounting grooves, on which a guide rod 553 is mounted, are formed through lower portions of the side surfaces of the first bracket part 511 and the second bracket part 512 in the left and right direction. Lower portions of the guide rod mounting grooves are open. In this embodiment, the guide rod mounting grooves are disposed rearward of the first member shaft 525.

A first member 520 is disposed closer to the side surface of the first bracket part 511 than to the side surface of the second bracket part 512.

In this embodiment, a first ratchet 521 is disposed above the first member shaft 525 in the locked state.

In the locked state, a latching rod 554 is disposed forward of the first member shaft 525.

The latching rod 554 is disposed below the first member shaft 525 in the locked state.

A first curved portion 522, the first ratchet 521, the latching rod 554 and a spring-latching portion 523 are sequentially arranged in a counterclockwise direction when viewed from the right side.

A second member 530 is disposed above the first member 520.

A second ratchet 531 engaged with the first ratchet 521 is formed on a first plate of the second member 530.

The second ratchet 531, a second curved portion 536, and a stopper projection 537 are sequentially disposed clockwise when viewed from the right side.

A return spring 560 is disposed inside the bracket 510 so as to be disposed on the left side of the second member 530.

In this embodiment, the other end 542 of a strap 540 is drawn rearward of the seat 1.

One end 541 of the strap 540 is fixed to a rear surface of the bracket 510 by the first bolt 551 and the second bolt 552.

Figure 11:
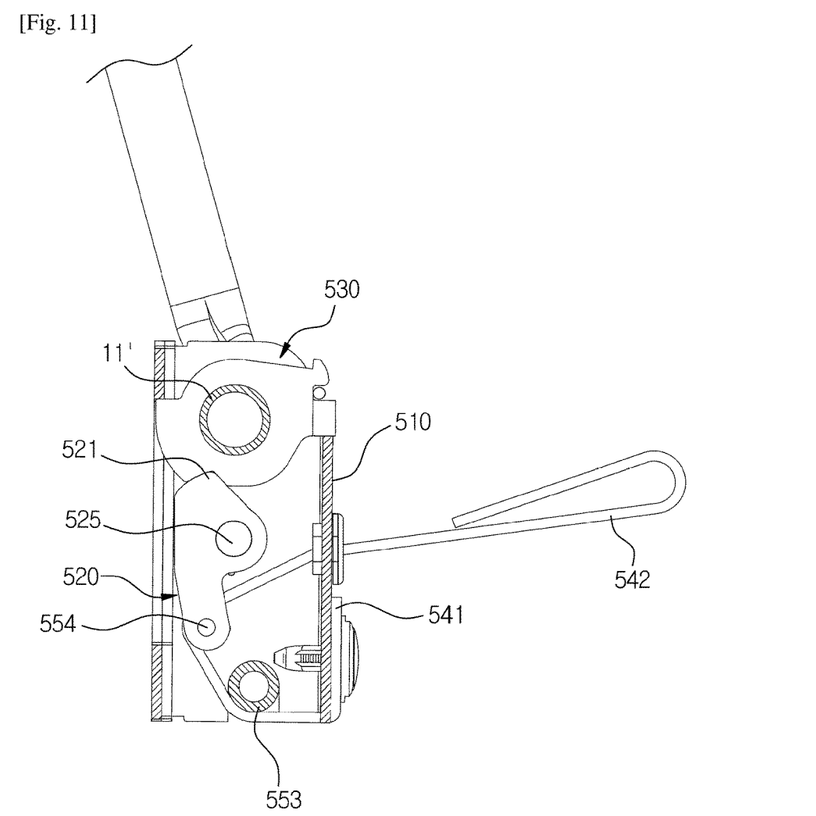
FIG. 11 is a sectional view of the headrest moving device according to the second embodiment of the present invention (upright state of headrest).

As shown in FIG. 11, the strap 540 with the fixed one end 541 is guided to an upper portion of the guide rod 553, latched on the latching rod 554 and then drawn to the outside.

In this embodiment, the guide rod 553 is disposed below the latching rod 554 when the headrest 2 is in the upright state.

In this embodiment, a bezel 555 is disposed above the first and second bolts 551 and 552, the guide rod 553, and the latching rod 554.

The bezel 555 is disposed below the first member shaft 525.

Hereinafter, the operation of the present embodiment having the above configuration will be described.

Unfolded State (Locked State)

As shown in FIG. 11, the first ratchet 521 is engaged with the second ratchet 531 so that the headrest 2 is maintained in the upright state on the seat 1.

Folded State (Unlocked State)

When a user pulls the other end 542 of the strap 540, the latching rod 554 latched on the strap 540 is moved rearward. As a result, the first member 520 rotates counterclockwise about the first member shaft 525 when viewed from the right side. Thus, the first ratchet 521 is disengaged from the second ratchet 531 so that the locking is released. The second member 530 and the headrest 2 are rotated about the first rod 11' by an elastic force of the return spring 560 so that the headrest 2 is folded forward.

As shown in FIG. 7, the second bracket part 512 is latched on one surface of the second member 530 so that the folding is completed.

The process of unfolding the folded headrest 2 is as follows.

Figure 12:
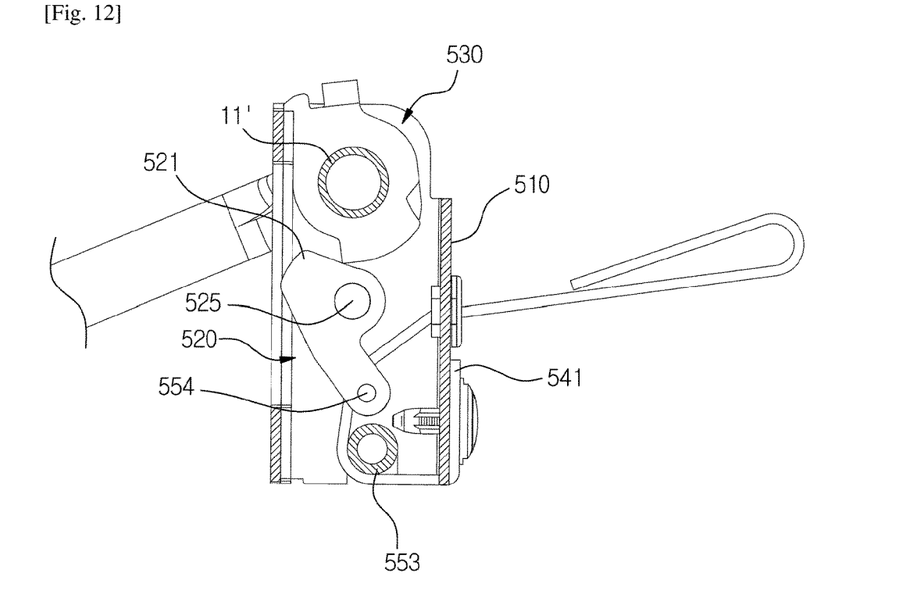
FIG. 12 is a sectional view of the headrest moving device according to the second embodiment of the present invention (folded state of headrest).

When the headrest 2 is lifted up and pushed rearward, the second member 530 and the headrest 2 are rotated clockwise. Further, the first member 520 is rotated clockwise by an elastic force of the first member spring 524. As a result, the first ratchet 521 is engaged with the second ratchet 531, so that the headrest 2 is maintained in the unfolded state.

As described above, although the present invention has been described with reference to the exemplary embodiments, various changes and alterations of the present invention can be made by those skilled in the art without departing from the spirit and the scope of the present invention defined by the following claims.

DESCRIPTION OF REFERENCE NUMERALS

Description of Main Components of Drawings

10: stay rod
11: first rod, 12: second rod
410: bracket, 411: first bracket part
412: second bracket part, 415: fastening hole
416: bezel mounting hole
420: first member, 421: first ratchet
422: first curved portion, 423: spring-latching portion
424: first member spring, 425: first member shaft
430: second member, 434: second ratchet
436: second curved portion
440: strap, 441: one end
442: other end, 451: first bolt
452: second bolt, 453: guide rod
454: latching rod, 455: bezel
460: return spring

The invention claimed is:

1. A headrest moving device comprising:
a stay rod;
a bracket which is rotatable or slidable relative to the stay rod;
a first member rotatably connected to the bracket;
a second member connected to the stay rod; and
a strap configured to rotate the first member, wherein
the first member is locked to or unlocked from the second member,
one end of the strap is connected to the bracket,
the other end of the strap is drawn to an outside of a headrest or a seat,
a guide rod configured to guide the strap is provided on the member to which the first member is connected, and
a latching rod configured to latch a portion between the one end and the other end of the strap is provided on the first member.

2. The headrest moving device of claim 1, wherein the bracket is disposed between both sides of the stay rod,
the first member is rotatably connected to the bracket and the second member is connected to the stay rod,
the first and second members are disposed inside the bracket,
the guide rod is spaced apart from the latching rod in an up/down direction, and
the guide rod is disposed between a front end and a rear end of the bracket.

* * * * *